April 26, 1966   J. C. STARKE   3,247,625
METHOD OF GRINDING
Filed April 24, 1963

INVENTOR.
JOSEPH C. STARKE
BY Willard R. Sprowls
ATTORNEY

United States Patent Office 3,247,625
Patented Apr. 26, 1966

3,247,625
METHOD OF GRINDING
Joseph C. Starke, Mishawaka, Ind., assignor to United States Rubber Company, New York, N.Y., a corporation of New Jersey
Filed Apr. 24, 1963, Ser. No. 275,404
2 Claims. (Cl. 51—281)

This invention relates to a method of grinding, and more particulraly to a method of grinding with a conductive grinding wheel to prevent the formation of pinholes in the object being ground.

One of the primary objects of grinding (or polishing) an article is to produce thereon a smooth surface. Depending upon the article being ground and the use intended therefor, various degrees of smoothness may be desired. Whereas the degree of smoothness required for a surface, such as a wall, which is to be painted is rather low, the degree of smoothness required for the inner surfaces of certain reaction vessels (reactors), valves, etc. and the outer surfaces of certain motor cylinders, pump rotors, etc. is rather high. It is especially important that the outer surfaces of certain objects which move rapidly in use, such as rockets and high speed planes, be as smooth and blemish-free as possible so as to reduce friction and local heating due to the swift passage of air thereby, and that all surfaces of a thin heat insulation layer, such as that used in filament-wound solid-propellant rockets, be smooth and of uniform thickness to prevent local heating of the filament-wound casing.

However, despite the exertion of the utmost in care during the grinding operation, electrically non-conductive surfaces, especially the rather thin surfaces commonly used in the glass and epoxy resin casings and compounded rubber insulation layers of rockets, have often been found to contain surface irregularities, in particular, small piercing holes called pinholes. The production of these pinholes in surfaces ground by prior art grinding techniques was for a long time unexplained. Spark tests on the units before grinding did not show their presence, yet testing of finished units disclosed, on an average, 6 to 12 pinhole perforations per 15 sq. feet of surface area. The presence of a single piercing pinhole in the compounded rubber of a forward or center rocket insulation unit renders it unacceptable under U.S. Government inspection requirements. Such insulation units are extremely thin, ordinarily being on the order of from several thousandths of an inch to one inch in thickness, and are designed to protect the rocket's outer casing, which may be either metal or a glass and epoxy resin laminated material, from the extremely high temperatures produced in the interior of the rocket by the combustion of the propellant. Pinholes extending throughout the thickness of the insulation expose the outer covering of the rocket directly to the high temperature of the interior of the rocket, and even pinholes which only partially extend through the insulation allow undesirable local heating of the outer covering in the regions adjacent the pinholes.

On the theory that these pinholes in the insulation were caused by a buildup of electrostatic charge on the grinding wheel during the grinding operation and subsequent resultant electrostatic discharge arcing, e.g., between the metal mandrel supporting the insulation on one side and the grinding wheel used to smooth the outer surface of the insulation unit on the other side, the grinding wheels used in this operation were tested for conductivity and found to be non-conductive, i.e., there existed no conductive path from the grinding surface of the wheel to a ground. It was further noted that, although pinhole production was most noticeable when the object being ground was electrically non-conductive and the mandrel or support of the article was electrically conductive, there was also undesirable pinhole production occurring whenever the materials of the grinding wheel and the object being ground were such as would normally cause an electrostatic charge separation (and resultant electrostatic potential) between the materials upon their being rubbed together, whether or not the mandrel or support for the article being ground was conductive. For example, pinhole production was also noted after the grinding of an unsupported non-conductive rocket casing of glass and epoxy resin with a conventional metallic grinding wheel.

The present invention contemplates and has as its primary object the provision of a method of grinding an article to produce a smooth surface characterized by an absence of pinholes by utilizing a conductive grinding wheel, whereby electrostatic charges developing on said wheel during grinding can be grounded.

Other objects and advantages of the present invention will be best understood from the following detailed description when read in conjunction with the accompanying drawing in which.

It will be understood that this invention pertains similarly to the use of polishing or buffer wheels as well as the use of grinding or abrasive wheels, although the discussion to follow deals primarily with the use of grinding wheels as the two types are identical for the purpose of explicating the instant process.

It has now been found that the advantages of this invention are realized when the same grinding wheel as previously used is provided on one or more of its side surfaces with an electrically conductive path.

Figure 1:
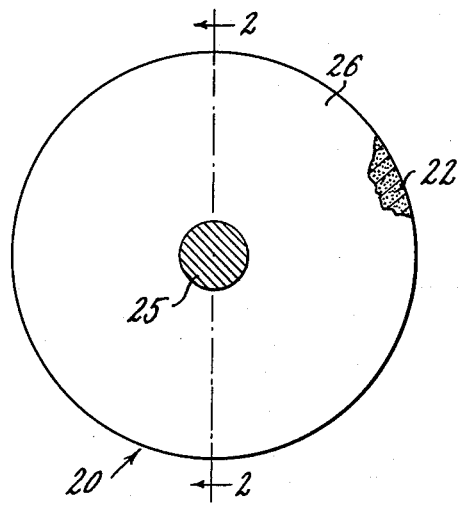
FIG. 1 is a side view of a grounded conductive wheel suitable for use in the instant process.
Figure 2:
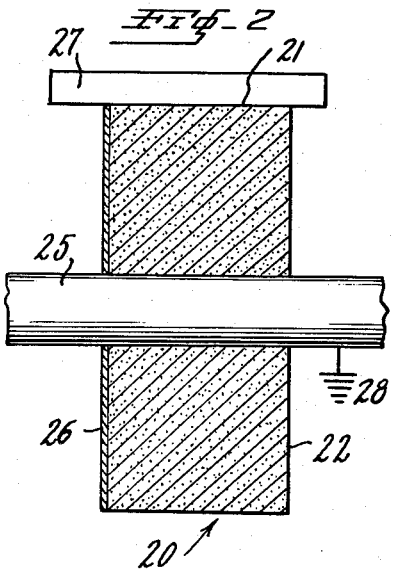
FIG. 2 is an elevation view of the wheel of FIG. 1 along line 2—2.

Referring now to FIGS. 1 and 2 in particular, a conventional abrasive grinding wheel 20, having, e.g., an 8 inch diameter, has flat side surfaces 22 and a grinding edge 21. It is mounted on a rotating shaft 25 for rotation as a unit therewith at, e.g., a peripheral wheel speed of 33 feet per second. The grinding wheel 20 directly contacts the shaft 25 for rotation therewith as a result of frictional forces therebetween, although other mechanical means such as a bushing may alternatively be used to lock the grinding wheel 20 on the shaft 25 for rotation therewith. The shaft 25 and/or the motor (not shown) used to rotate the shaft is electrically grounded 28, i.e., connected with a ground such as the earth. The shaft 20 is composed of metal or any other suitable conductive material.

The composition and construction of the abrasive grinding wheel 20 will vary greatly depending upon the material of the article being ground, the surface texture desired, the anticipated speed of rotation of the grinding wheel, etc. Conventional grinding wheels are described in U.S. 2,381,266, U.S. 2,916,368 and U.S. 2,943,926. Typically, a grinding wheel is non-conductive and has abrasive grains, such as aluminum oxide, silicon carbide, or any of the known abrasives, blended into and irreversibly or non-thermoplastically bonded with a filler, such as hard vulcanized rubber, phenol-formaldehyde resin or other analogous hard resins. Such a grinding wheel may be made by techniques well known in the art, such as mixing a hard rubber with about one-half of its weight of sulfur, partially polymerizing the rubber, mixing in the adhesive grains, completing polymerization of the rubber, and then vulcanizing and curing the rubber in a mold conforming to the desired shape of the grinding wheel to form a hard non-resilient grinding wheel.

In accordance with this invention, the flat side surface 22 of the grinding wheel 20 is coated with a conductive path 26. The conductive path 26 is composed, e.g., of aluminum, a metal conductor preferred for ease of application over other suitable metallic conductors such as copper, brass, steel, etc. The metal conductor may be applied either as a pure metal or as finely divided particles in a binding media of the type described in U.S. 2,761,849 and 2,321,587. Similarly, the conductive path 26 may be composed of any one or more of a number of various non-metallic conductive plastics, rubbers, paints, oils, and waxes well known in the electrical art and described in such patents as U.S. 2,597,741 and, especially, 2,945,825 (citing such organic conductors as acetamide, ethyl acetoacetate, octyl alcohol, formamide, 1,3-propane diol, and diethyl oxalate). The existence of a conductive path leading from the grinding edge 21 of the grinding wheel to a ground prevents the electrostatic charge buildup between a rotating grinding (or polishing) wheel and a non-conductive surface, which charge buildup results in discharge arcing and pinhole production.

Figure 3:
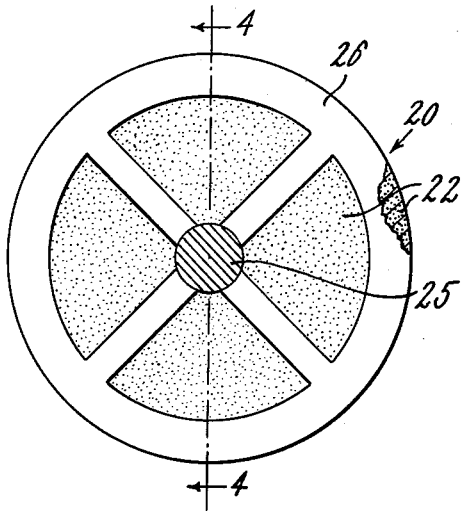
FIG. 3 is a side view of another suitable grounded conductive wheel.
Figure 4:
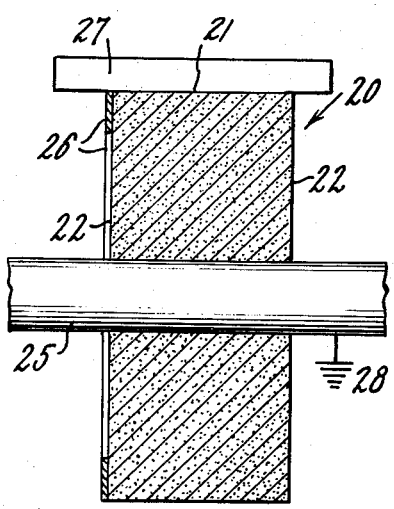
FIG. 4 is an elevation view of the wheel of FIG. 3 along line 4—4.

The conductive path 26 preferably, as in FIGS. 1 and 2, covers 100% of at least one entire side surface 22 of the wheel 20 to insure an adequate path for charge flow. Alternatively, as in FIGS. 3 and 4, the conductive path 26 may desirably assume the outline of a spoked wheel having a continuous outer rim of conductive material extending inwardly, say about one-half to one inch, from the edge of the wheel periphery and a plurality of continuous radial lines of conductive material connecting such outer rim to the shaft or other ground. The path extends necessarily to the periphery of the wheel so that charges building up on the grinding surface will travel along the low resistance route of the proximate conductive path rather than building up to the potential necessary for discharge arcing across to the surface being ground. Similarly, the conductive path 26 may be in the form of other patterns, provided always that the surface of the grinding wheel presents a conductive contacting surface to the non-conductive layer 27 being ground which permits the passage of the charge across the face or flat side surface 22 of the grinding wheel. Many factors affect the efficiency of the conductive grinding wheel and dictate the thickness of the conductive path 26, the extent to which and the patterns in which the path must cover a side surface of the wheel to be efficient. Such factors include: (a) the material being abraded, (b) the efficiency of the grinding material, (c) the amount of static electricity produced, (d) the speed of rotation of the grinding wheels, (e) the thickness and insulation value of the part being ground, etc.

The conductive path 26 applied to the side surface 22 of the grinding wheel 20 must provide a continuous conductive path from the edge of the grinding surface of the grinding wheel 20 to the grounded conductive shaft 25 on which the grinding wheel 20 is mounted or be otherwise grounded. If conductive side plates are used on the conductive shaft to prevent displacement of the wheel along the shaft and/or conductive bushings are used on the conductive shaft to lock the wheel to the shaft for rotation therewith, the side plates and/or bushings may be considered as part of the conductive path 26. If non-conductive side plates and/or non-conductive bushings are used, the side plates and/or bushings may be considered as part of the side surface of wheel 20 and should be coated with the conductive path 26. No auxiliary grounding technique is ordinarily necessary to ground the rotating conductive shaft as the motor which causes it to rotate is desirably properly grounded when installed in the factory.

The desirable thickness of the conductive path 26 applied to the grinding wheel 20 is from approximately .0005 to .0015 inch, preferably about .001 inch. This thickness of coating can be applied, for example, by spray metal techniques on the flat face or side surface 22 of a wheel in less than 15 seconds. The thickness is, however, not as important as the continuity of the conductive path 26.

The continuous conductive path 26, as shown in FIGS. 1 and 2, was applied on one side of a conventional abrasive grinding wheel (sold by the Sterling Grinding Wheel Company and described as a 7" x 1¼" x ½" No. ZA–4618–V2). Without any preparatory treatment to the wheel, the conductive path 26 was applied in the form of molten metal aluminum by a flame sprayer (Metco Model 4E Metal Spray Gun) using aluminum wire (Metco SF aluminum wire) heated by oxyacetylene. The wheel 20 may be rendered conductive through the aforementioned spray metal technique without appreciably affecting its abrasive properties or requiring redressing of the grinding surface to remove portions of the conductive path 26. Although the spray metal technique is especially quick, rapid and inexpensive, other conventional techniques for applying thin metal layers, such as electroplating or applying thin metal foils with cement, may be used; some of these other suitable techniques are described in Modern Plastics, volume 39, No. 9, pp. 139–140 (May 1962). The conductive path 26 may be porous or nonporous so long as one or more electrically conductive paths to the ground are maintained.

Although metal coatings and restraining plates have been used to provide lateral reinforcement for grinding wheels, as described in U.S. Patent No. 1,982,710, the structure of the conductive grinding wheels of the instant invention is considerably different from that of the reinforced grinding wheels. Further details of the conductive path 26 of the conductive grinding wheels may best be highlighted by a comparison with the details of the reinforcements of the reinforced grinding wheels. Such reinforcements are used primarily on high speed grinding wheels (having peripheral speeds of about 110' per second ) rather than the low speed grinding wheels (having peripheral speeds of about 33' per second) which are used for smoothing rocket insulation surfaces so as to avoid degradation of the surface being ground through heat buildup.

Further, such reinforcements are thick and heavy so as to provide sufficient strength for their intended purpose, thereby increasing the mass of the grinding wheel and, as a result, requiring greater energy inputs thereto to attain desired speeds of rotation. By way of comparison, the thin and light amounts of conductive material applied in the instant invention are much less than would be considered a metal reinforcement and barely affect the mass of the wheel. A conductive path 26 of metal must by necessity be extremely thin and friable so that it does not interfere with the grinding operation as the surface of the grinding wheel wears off. It must be freely abradable, along with the grinding wheel surface, in order to prevent damage to the part being ground. The minimum critical thickness of the conductive material will only be governed by the amount of conductivity necessary to carry the electrical potential created through abrasive friction. For instance, whereas the patent referred to above requires a minimum application time of approximately 5 minutes on each side of the abrasive wheel to achieve an unspecified thickness sufficient for reinforcing purposes (page 1, lines 105–106), in the instant invention an 8" diameter wheel is coated with a .001 inch thickness sufficient for conductive purposes in less than 15 seconds with the same type of spray metal technique.

Furthermore, whereas a metal reinforcement must cover the entire area of both sides of the grinding wheel in order to be truly effective, a conductive path covering a single side surface (as in FIGS. 1 and 2) or a path forming a spoked wheel on a single side surface (as in FIGS. 3 and 4) suffices for the purposes of the instant invention. By way of contrast, if a heavy-weight metal reinforcement—as opposed to the comparatively light-weight conductive path—covered only one side of a grinding wheel, the wheel would be completely unbalanced.

Again, whereas the molten metal for the reinforcement must be applied with great pressure and rigidly rooted into the very pores of the grinding wheel to form a very firmly adhering coating thereon (page 1, lines 97–100 of U.S. 1,982,710), the conductive path of the instant invention need be bonded or cemented only to the outer surface of the side of the grinding wheel and only as strongly as is necessary to prevent displacement of the conductive path from the wheel (i.e., without adding any substantial structural strength to the wheel).

And finally, the compositions of finely divided metal particles in binding media and, especially the compositions of non-metallic conductors which may be used to provide conductive paths in the instant invention as so deficient in structural strength that they just cannot be considered as "reinforcements."

Although it is essential that the grinding wheels be grounded, the exact method of grounding will vary with the amount of the discharge expected and convenience. In the embodiments of the drawings, the conductive path is grounded through the conductive shaft 25 of the grounded motor which causes the grinding wheel to rotate. In other embodiments, other means, such as conductive bushings, slip-rings, etc., may be provided to directly connect the conductive path 26 to a ground.

Spark testing of insulation units ground with the conductive grinding wheel of this invention has disclosed a complete absence of pinhole perforations, from which fact it is evident that there was little, if any, static electrical potential buildup.

Of course, many modifications of this process and the conductive grinding wheels used therein will become apparent to those skilled in the art. Consequently, the spirit and scope of this invention should not be considered as defined by the foregoing disclosure, but by the appended claims.

Having thus described my invention, what I claim and desire to protect by Letters Patent is:

1. A method of producing a smooth surface characterized by a substantial absence of pinholes on an electrically non-conductive article comprising contacting said article with a rotating abrading wheel while maintaining a continuous electrically conductive path from the area of engagement between said brading wheel and the said article to an electrical ground, whereby electrostatic charges developed during the abrasion process are harmlessly conducted away rather than discharging through said surface.

2. In the process of forming a smooth surface on an electrically non-conductive article by contacting said article with a rotating abrading wheel, the improvement of avoiding the formation in said article to pinholes created by the arcing through said article of static electrical charges created by said contacting comprising maintaining an electrically conductive path from the area of engagement of said rotating wheel with said article to an electrical ground during the entire period of said contact.

References Cited by the Examiner

UNITED STATES PATENTS

| 416,873 | 12/1889 | Tilghman. | |
| 1,872,667 | 8/1932 | Bryant | 51—165 |
| 2,086,516 | 7/1937 | Curtin | 317—2 |
| 2,572,426 | 10/1951 | Andrews | 317—2 |
| 2,947,121 | 8/1960 | Coes | 51—134.5 |

FOREIGN PATENTS

| 587,435 | 8/1947 | Great Britain. |

LESTER M. SWINGLE, *Primary Examiner.*

J. SPENCER OVERHOLSER, *Examiner.*